United States Patent
Abdul et al.

(10) Patent No.: US 10,354,046 B2
(45) Date of Patent: *Jul. 16, 2019

(54) PROGRAMMABLE CLOCK DIVISION METHODOLOGY WITH IN-CONTEXT FREQUENCY CHECKING

(71) Applicant: International Business Machines Corporation, Armonk, NY (US)

(72) Inventors: Naiju K Abdul, Bangalore (IN); Jennifer E. Basile, Poughkeepsie, NY (US); Hemlata Gupta, Hopewell Junction, NY (US); Kerim Kalafala, Rhinebeck, NY (US); Jeremy J. Leitzen, Kasson, MN (US); Stephen G. Shuma, Underhill, VT (US); Manish Verma, Bangalore (IN); James D. Warnock, Somers, NY (US); Michael H. Wood, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,314

(22) Filed: Nov. 13, 2017

(65) Prior Publication Data
US 2018/0068051 A1    Mar. 8, 2018

Related U.S. Application Data

(63) Continuation of application No. 15/165,058, filed on May 26, 2016, now Pat. No. 9,910,954.

(51) Int. Cl.
*G06F 17/50* (2006.01)

(52) U.S. Cl.
CPC ...... *G06F 17/5081* (2013.01); *G06F 2217/62* (2013.01); *G06F 2217/84* (2013.01)

(58) Field of Classification Search
CPC .................................................. G06F 17/5081
(Continued)

(56) References Cited

U.S. PATENT DOCUMENTS 9,910,954 B2 *   3/2018   Abdul et al. ........ G06F 17/5081
9,977,850 B2     5/2018   Abdul et al.
(Continued)

OTHER PUBLICATIONS

List of IBM Patents or Patent Applications Treated as Related; (Appendix P), Filed Sep. 20, 2018; 2 pages.
(Continued)

*Primary Examiner* — Sun J Lin
(74) *Attorney, Agent, or Firm* — Cantor Colburn LLP; Steven Meyers

(57) ABSTRACT

A method, system, and compute program product use a generalized macro or a generalized macro timing abstract for timing analysis in a specific timing context. The method includes setting up a timer, and determining a divide ratio of each external clock divider of one or more external clock dividers associated with the generalized macro or the generalized macro timing abstract programmatically as a function of another value. The method also includes performing the timing analysis using the divide ratios of the one or more external clock dividers. Obtaining a physical implementation of an integrated circuit is based on the timing analysis.

11 Claims, 10 Drawing Sheets

(58) Field of Classification Search
USPC .......................................................... 716/113
See application file for complete search history.

(56) References Cited

U.S. PATENT DOCUMENTS

2017/0337313 A1    11/2017   Abdul et al.
2018/0173833 A1    6/2018    Abdul et al.

OTHER PUBLICATIONS

List of IBM Patents or Patent Applications Treated as Related; (Appendix P), Filed Nov. 13, 2017; 2 pages.
Naiju K. Abdul et al., "Programmable Clock Division Methodology With In-Context Frequency Checking", U.S. Appl. No. 15/165,058, filed May 26, 2016.

* cited by examiner

PROGRAMMABLE CLOCK DIVISION METHODOLOGY WITH IN-CONTEXT FREQUENCY CHECKING

DOMESTIC PRIORITY

This application is a continuation of U.S. application Ser. No. 15/165,058 filed May 26, 2016, the disclosure of which is incorporated herein by reference in its entirety.

BACKGROUND

The present invention relates to timing analysis of an integrated circuit design, and more specifically, to a programmable clock division methodology with in-context frequency checking.

The fabrication of an integrated circuit or chip includes several steps to finalize a logic design and analysis and physical implementation. The chip may be designed according to a hierarchical design methodology such that the chip is divided into cores or nests, with each core or nest divided into units that are further divided into macros. The logic design and component placement must result in a physical implementation that meets the requirements for the chip with regard to timing, power, noise, and other aspects. To this end, design analysis (e.g., timing analysis, power analysis, noise analysis) is performed at different hierarchical levels and at different stages of design.

SUMMARY

According to embodiments, a method, system, and computer program product use a generalized macro or a generalized macro timing abstract for timing analysis in a specific timing context. The method includes setting up a timer; determining, using a processor, a divide ratio of each external clock divider associated with the generalized macro or the generalized macro timing abstract programmatically as a function of another value; performing the timing analysis using the divide ratios; and obtaining a physical implementation of an integrated circuit based on the timing analysis.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 2-6 show exemplary configurations of clock dividers that are processed according to one or more embodiments, in which:

FIG. 2 shows a clock generator that supplies two units;

FIG. 3 shows an exemplary unit with a macro that may be generalized according to one or more embodiments;

FIG. 4 shows an exemplary unit with an exemplary macro that may be generalized only with regard to one of its input ports according to one or more embodiments;

FIG. 5 shows an exemplary unit with an exemplary macro that is not generalized based on processing according to one or more embodiments; and FIG. 6 shows an exemplary macro with multiplexed clocks that is generalized according to one or more embodiments;

DETAILED DESCRIPTION

Figure 1:
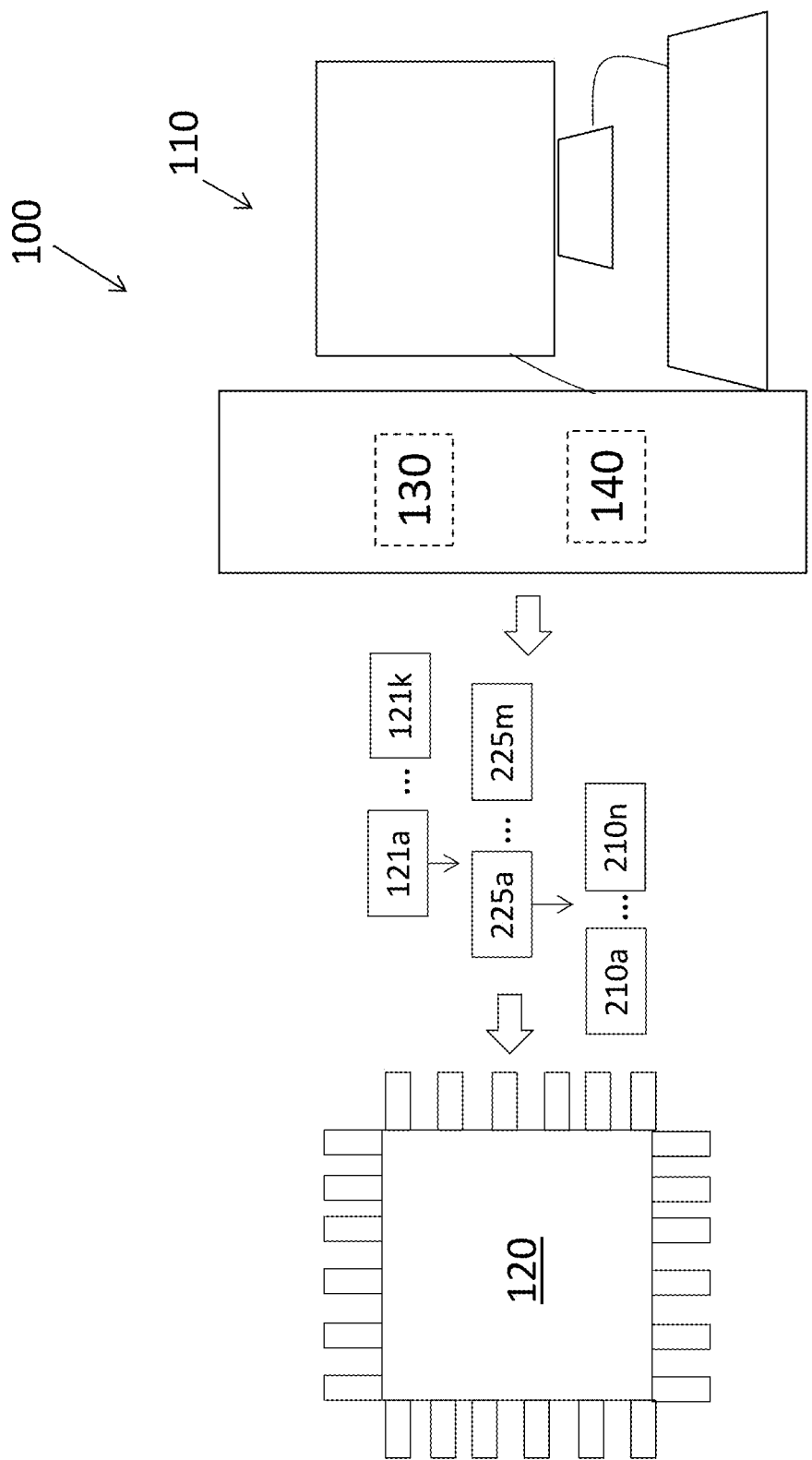
FIG. 1 is a block diagram of a system according to embodiments of the invention.

As previously noted, design analysis, such as timing analysis, is an important part of ensuring that a physical implementation of an integrated circuit (chip) will meet the requirements. Static timing analysis (STA) is generally performed to efficiently accomplish timing analysis without simulating the full integrated circuit. In STA, the chip design is represented as a timing graph with nodes indicating points (e.g., circuit elements) in the design where timing information is desired and connections between nodes being represented as arcs. STA is performed at different stages of the design, but analyzing the entire chip design at every stage is inefficient in terms of run-time. Instead, a hierarchical design methodology is used and timing analysis is performed at different hierarchical levels (e.g., core, unit, macro) based on the needs at any given design stage.

A macro may be a single logic gate or a collection of transistors or gates interconnected with wires and designed to perform a certain task. Detailed analysis may be performed at the macro level. For example, macros may be timed using accurate timing analysis techniques that include transistor level timing tools or gate level timing tools. This type of detailed analysis may be followed by generation of abstract models that represent the relevant characteristic of the macro in a simplified form. For example, a macro timing abstract represents timing characteristics in a simplified form. The generation of abstract models may be referred to as abstraction, performed by an abstractor. At higher levels (e.g., unit level, core level), macros are represented by abstracts for purposes of performing the analysis. A unit comprised of several macros, each associated with abstracts, may itself be abstracted. Thus, for purposes of discussing abstracts, macro may generally refer to any component that is abstracted. Because macros are reused in different parts of the chip design at different levels of hierarchy, the same macro may be part of different clock domains. More specifically, the same macro may be used with different clock dividers.

A prior approach to timing analysis involves generating a different abstract for a given macro for every clock division. For example, a particular macro may be used with a clock divider that divides the base clock signal from the clock generator by 2 and also with a clock divider that divides the base clock signal from the clock generator by 4. Two timing abstracts are generated for that macro, one for each clock divider.

Turning now to an overview of the present disclosure, one or more embodiments relate to generalizing a macro or a macro timing abstract to be reused with different clock dividers. The instantiation of a macro or macro timing abstract in a particular place on the chip with a particular clock domain and clock divider is referred to as use of the macro or macro timing abstract in context. One or more embodiments detailed below relate to generalizing a macro or macro timing abstract (obtaining an out of context macro or macro timing abstract) and then obtaining an in-context macro or macro timing abstract at different places in the design as needed. Embodiments also relate to verifying a generalized timing abstract for use in a particular context. The verification is not only done at each local clock buffer but cross domain checking is also performed, as further detailed with reference to FIG. 10.

Turning now to a more detailed description of one or more embodiments, FIG. 1 is a block diagram of a system 100 according to embodiments of the invention. The system 100 includes a processing system 110 used to design an integrated circuit and the resulting physical implementation of the integrated circuit or chip 120. The hierarchical organization of the chip 120 is shown in FIG. 1 as including cores 121, units 225, and macros 210. Exemplary cores 121a through 121k are shown. Core 121a is shown to include units 225a through 225m, and unit 225a is shown to include macros 210a through 210n. Different cores 121 may include different numbers of units 225, and different units 225 may include different numbers of macros 210. The processing system 110 includes one or more memory devices 130 and one or more processors 140. Multiple of the processors 140 may be used in the processes for generating and subsequently instantiating out of context macros and macro timing abstracts, as detailed below. The memory device 130 stores instructions implemented by the processor 140. As further discussed, these instructions include processes used to generate out of context macros and macro timing abstracts.

FIGS. 2-6 show exemplary configurations of clock dividers 220 that are processed according to one or more embodiments. The figures show only the portion of the macro 210 or unit 225 that are relevant to embodiments of the invention. Timing analysis and the hierarchical chip 120 methodologies are well-known, and it should be clearly understood that macros 210 and units 225 may include many additional components that are not shown in the figures. FIG. 2-6 show different configurations of clock dividers 220 both within and outside of macros 210. The processing associated with these clock dividers 220 is further detailed with reference to FIGS. 7 and 8. In timing analysis, a macro 210 may be used as it is or may be abstracted. A macro 210 may include a constraint or attribute at its input port 215 or use a netname, which is the name associated with a network signal coming into the input port 215, to determine a divide ratio, as detailed below. The input port 215 may be referred to as a test port and is used to suppress clock cycles based on a clock divider 220 being between the clock generator 205 and the input port 215. That is, for example, when the clock divider 220 has a divide ratio of two, the input port 215 suppresses every other clock cycle. A timing abstract of a macro 210 includes a constraint the output of the local clock divider 240 that specifies the divide ratio. This constraint may be generalized according to embodiments detailed herein.

Figure 2:
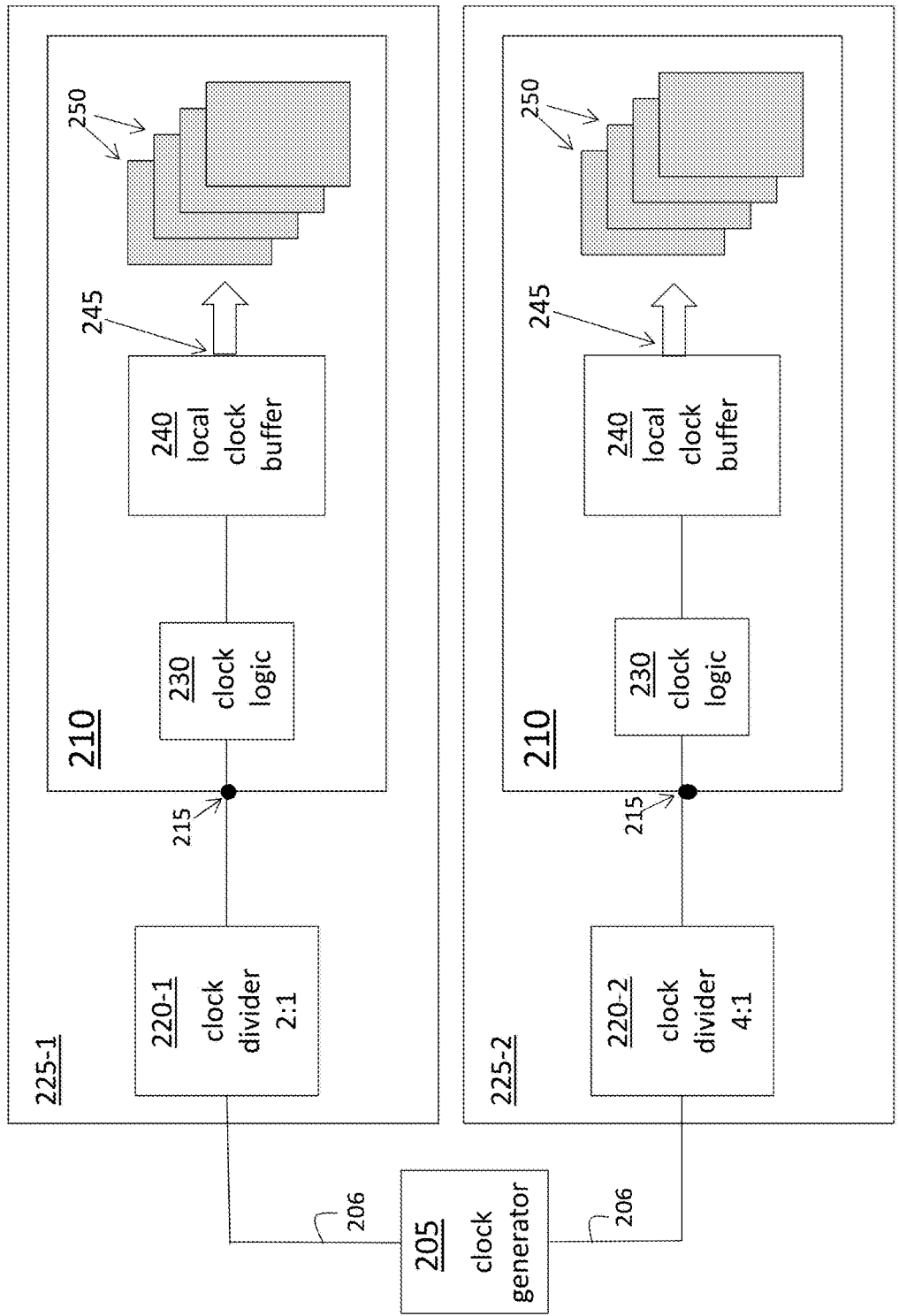

FIG. 2 shows a clock generator 205 that supplies two units 225-1, 225-2. Both of the units 225-1, 225-2 include the same macro 210. The exemplary macro 210 includes one input port 215 for the clock signal. In unit 225-1, the base clock signal 206 from the clock generator 205 encounters a clock divider 220-1 with a divide ratio of 2:1 before supplying macro 210, and in unit 225-2, the base clock signal 206 from the clock generator 205 encounters a clock divider 220-2 with a divide ratio of 4:1 before supplying the macro 210. The macro 210 includes clock logic 230 and a local clock buffer 240 that supplies several latches 250 at its output port 245. As noted previously, other components of the macro 210 and units 225-1, 225-2 that are not relevant to the clock division are not shown or detailed herein. The macro 210 may be used as is or may be represented by a timing abstract when performing timing analysis. According to one or more embodiments, the macro or one timing abstract of the macro may be generalized to be used in both unit 225-1 with the 2:1 clock divider 220-1 and in unit 225-2 with the 4:1 clock divider 220-2.

Figure 3:
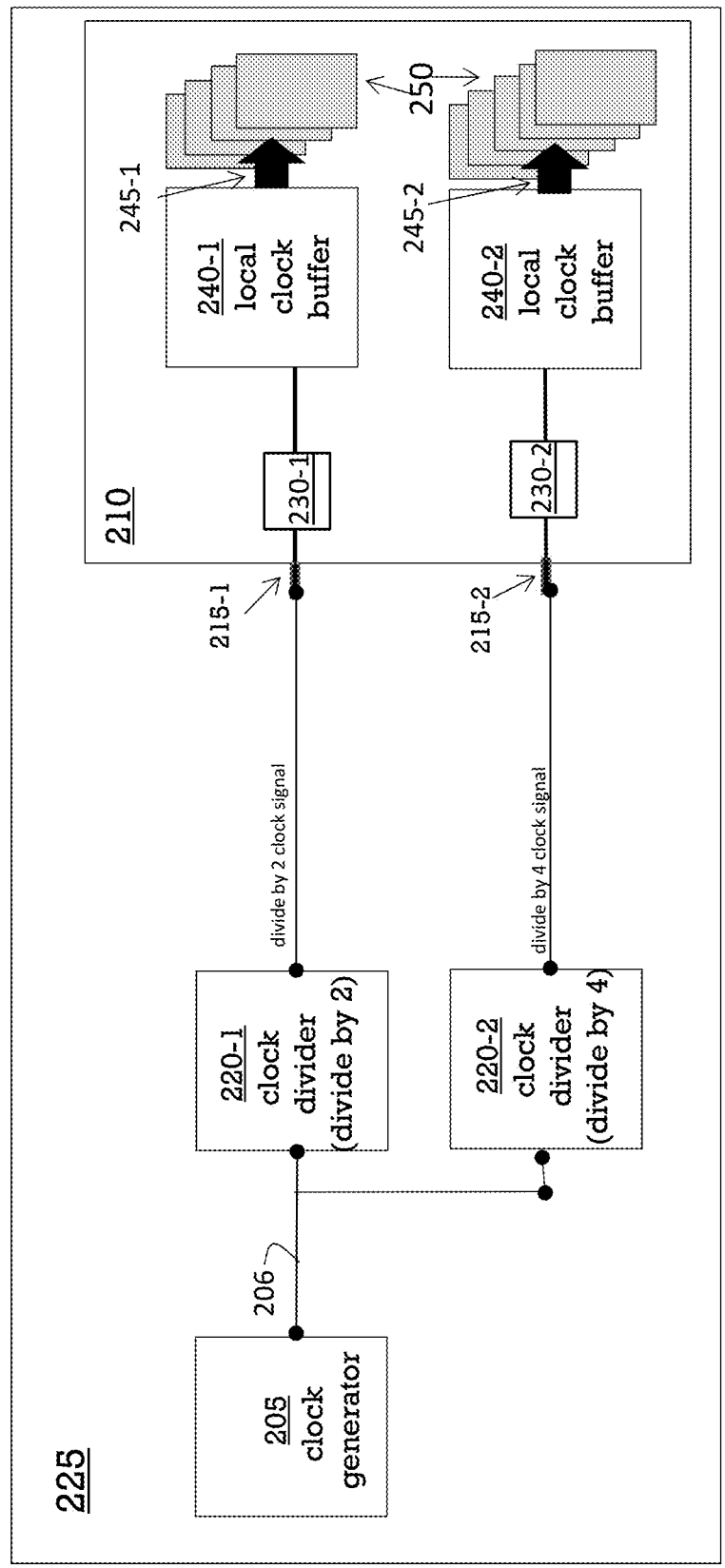

FIG. 3 shows an exemplary unit 225 with a macro 210 that may be generalized according to one or more embodiments. As FIGS. 2 and 3 indicate, the clock generator 205 may be inside a unit 225 (as in FIG. 3) or outside a unit 225-1, 225-1 (as in FIG. 2), where it may supply more than one unit 225. The macro 210 in FIG. 3 includes two input ports 215-1, 215-2 leading respectively to two local clock buffers 240-1, 240-2. Each local clock buffer 240-1, 240-2 output (at the respective port 245-1, 245-2) is divided according to the associated clock divider 220-1, 220-2. As detailed below, the netname, which is the name associated with the network signal coming into each port 215-1, 215-2 may be coded with the divide ratio of the associated clock divider 220-1, 220-2. For example, the netname associated with port 215-1 may include "2to1" and the netname associated with port 215-2 may include "4to1."

Figure 4:
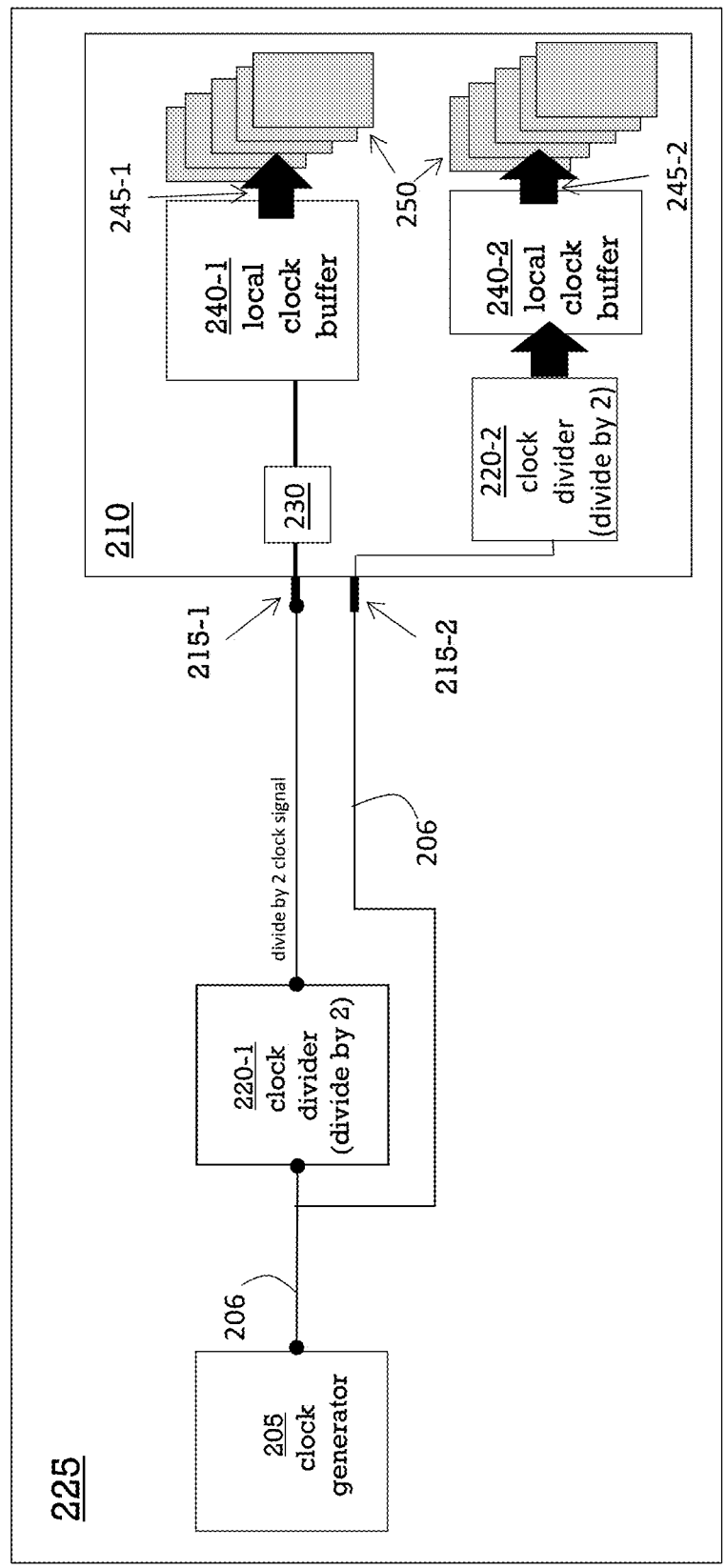

FIG. 4 shows an exemplary unit 225 with an exemplary macro 210 that may be generalized only with regard to one of its input ports 215-1 according to one or more embodiments. As FIG. 4 indicates, the clock divider 220-1 external to the macro 210 is associated with input port 215-1, but the clock generator 205 base clock signal 206 is unmodified at input port 215-2. Instead, an internal clock divider 220-2 is associated with input port 215-2. Because both exemplary clock dividers 220-1, 220-2 specify a clock ration of 2:1, both the output port 245-1 associated with the local clock buffer 240-1 and the output port 245-2 associated with the local clock buffer 240-2 provide the base clock signal 206 divided by two. Yet, as further detailed below, the internal clock divider 220-2 is not (and need not be) generalized but the external clock divider 220-1 is generalized. The internal clock divider 220-2 need not be generalized because it will be the same for every reuse of the macro 210.

Figure 5:
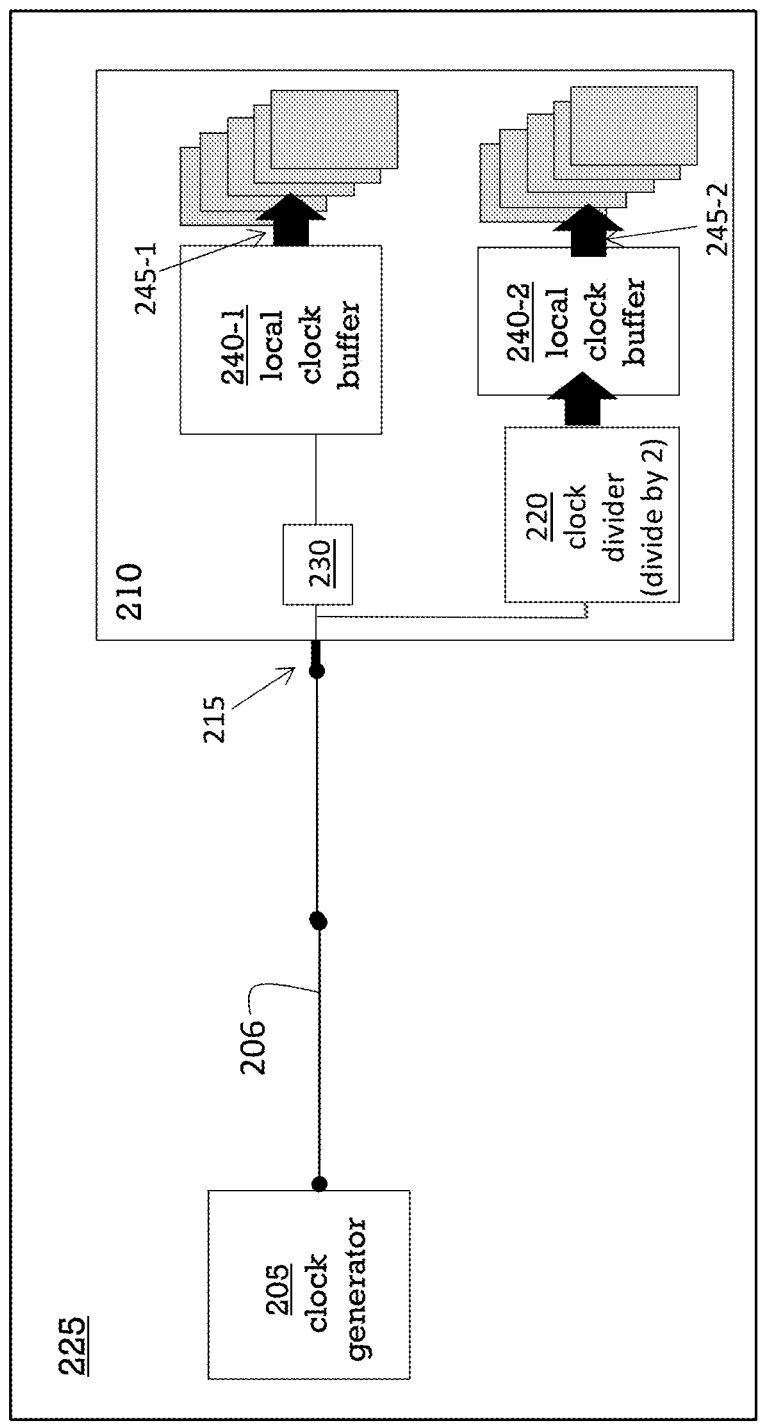

FIG. 5 shows an exemplary unit 225 with an exemplary macro 210 that is not generalized based on processing according to one or more embodiments. The exemplary macro 210 has one input port 215 that receives the base clock signal 206 from the clock generator 205. As FIG. 5 indicates, there is no external clock divider 220 in the unit 225. There is an internal clock divider 220 at the input of one of the local clock buffers 240-2. Thus, the output at the local clock buffer 240-1 (at output port 245-1), which is not associated with an internal or external clock divider 220 is not divided from the base clock signal 206. The output at the local clock buffer 240-2 (at output port 245-2) is divided by two because of the internal divider 220. As noted with reference to FIG. 4, the internal clock divider 220 is not (and need not be) generalized. This is shown in the process flows at FIGS. 7 and 8.

Figure 6:
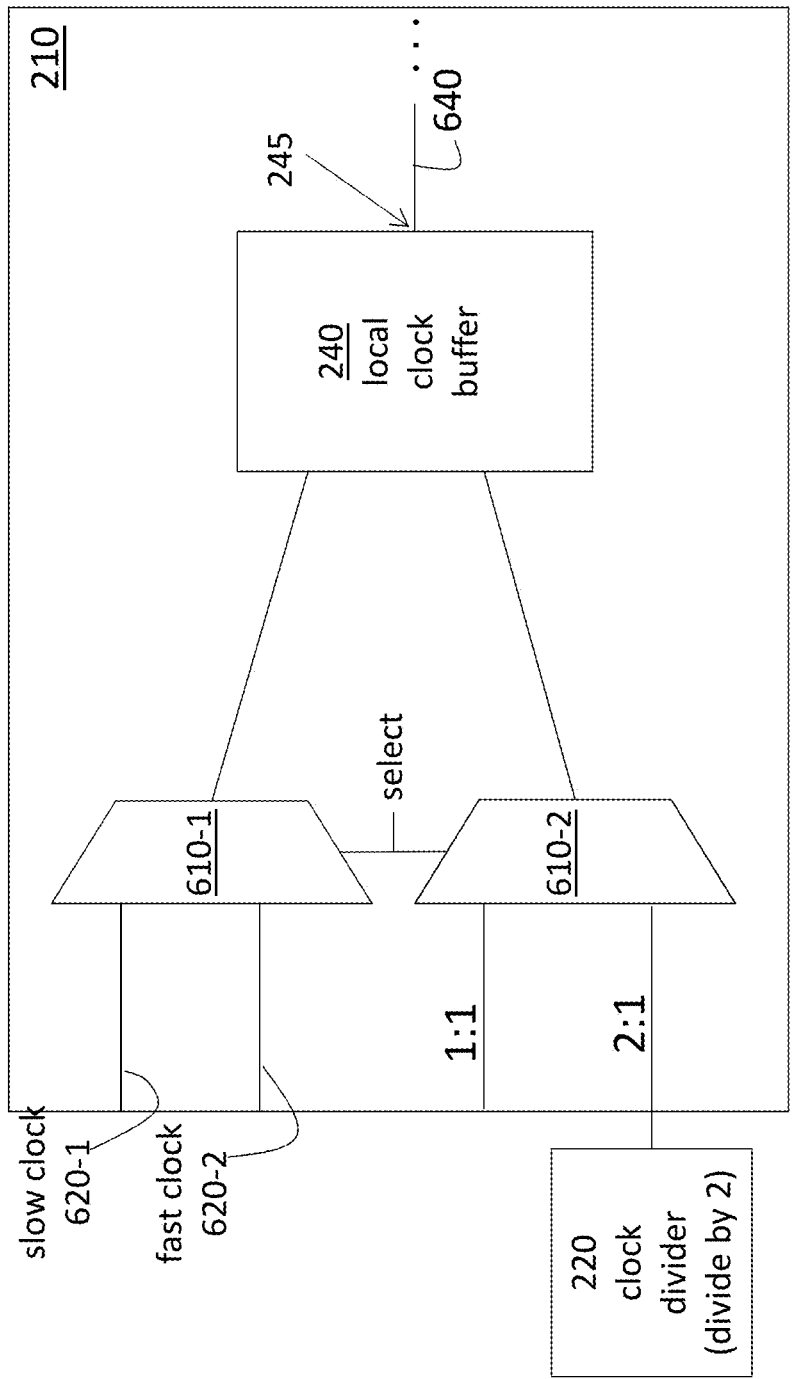

FIG. 6 shows an exemplary macro 210 with multiplexed (muxed) clocks that are generalized according to one or more embodiments. One or more clock generators 205 may drive a slow clock signal 620-1 or a fast clock signal 620-2. The slow clock signal 620-1 is not associated with a clock divider while the fast clock signal 620-2 is associated with a clock divider 220 with a divide ratio of 2:1. Thus, the local clock buffer 240 output signal 640 (at output port 245) is the slow clock signal 620-1 or the fast clock signal 620-2 divided by two. As detailed below, the clock divider 220 may be generalized.

Figure 7:
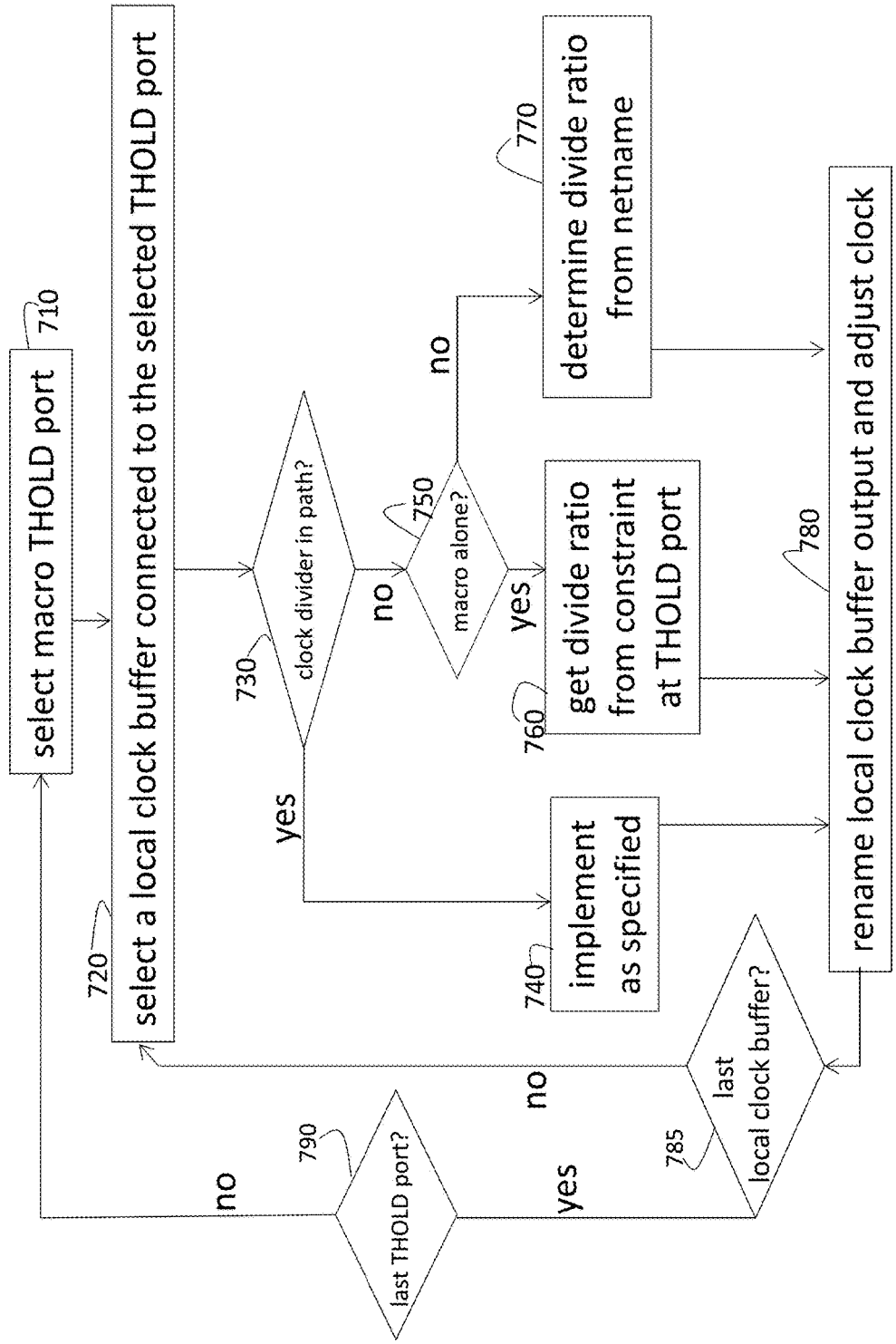
FIG. 7 is a process flow of a method of using a macro in context according to one or more embodiments.

FIG. 7 is a process flow of a method of using a macro 210 in context according to one or more embodiments. Because the same macro 210 may be used in different parts of the chip 120 and may be associated with different external clock dividers 220, the processes facilitate determining the division at the output port 245 of the local clock buffer 240. When the macro 210 is one of several within a unit 225, the processes shown in FIG. 7 are repeated for every macro 210. At block 710, selecting a macro 210 input port 215 is followed by selecting a local clock buffer 240 connected to the selected input port 215, at block 720. As shown in FIG. 5, for example, the same input port 215 may be connected to more than one local clock buffer 240-1, 240-2.

At block 730, checking to see if there is a clock divider 220 in the path refers to determining whether there is a clock divider 220 between the selected input port 215 and the selected local clock buffer 240. As FIG. 4 indicates, for example, where there is a clock divider 220-2 between an input port 215-2 and a local clock buffer 240-2, the clock divider 220-2 is internal to the macro 210. As previously noted, an internal clock divider 220 may be hard coded because it does not change for any instantiation of the macro 210 anywhere on the chip 120. Thus, if the result of the check at block 730 is yes, then the divide ratio (of the internal clock divider 220) is implemented as specified, at block 740. If the result of the check at block 730 is no, then the clock divider 220 is external to the macro 210 and may be different for different timing contexts in which the macro 210 is used. In this case, it is determined, at block 750, if the macro 210 alone is being analyzed. That is, it is determined whether the timing analysis is being performed at the macro 210 level or a higher level (e.g., unit 225 level or core 123 level).

If the result of the check at block 750 is yes (timing analysis is at the macro 210 level), then getting the divide ratio from the constraint at the input port 215 is performed at block 760. If the result of the check at block 750 is no (timing analysis is at a higher hierarchical level than the macro 210), then determining the divide ratio from the netname is performed at block 770. As previously noted, the divide ratio is encoded in the netname such that the network-specific signal coming into the input port 215 may include "2to1" or "4to1" in the name. Whichever process is used to determine the divide ratio—it is implemented according to a hard-coded value (at block 740), it is determined from the constraint at the input port 215 (at block 760), or it is determined from the netname (at block 770)—renaming the local clock buffer 240 output port 245 and adjusting the clock is performed at block 780. Renaming the clock at the output port 245 that goes to the latches 250 is to indicate the division that was performed. As such, the divide ratio may be included in the name. Adjusting the clock includes adjusting the falling edge of the clock based on the division that was done to the base clock signal 206.

The check at block 785 ensures that every local clock buffer 240 connected to the currently selected input port 215 is processed according to blocks 730 through 780. The check at block 790 ensures that every input port 215 of the macro 210 is processed according to blocks 720 through 785. As previously noted, all of the processes shown in FIG. 7 may be repeated for every macro 210 within a unit 225 (or core 121 or chip 120).

Figure 8:
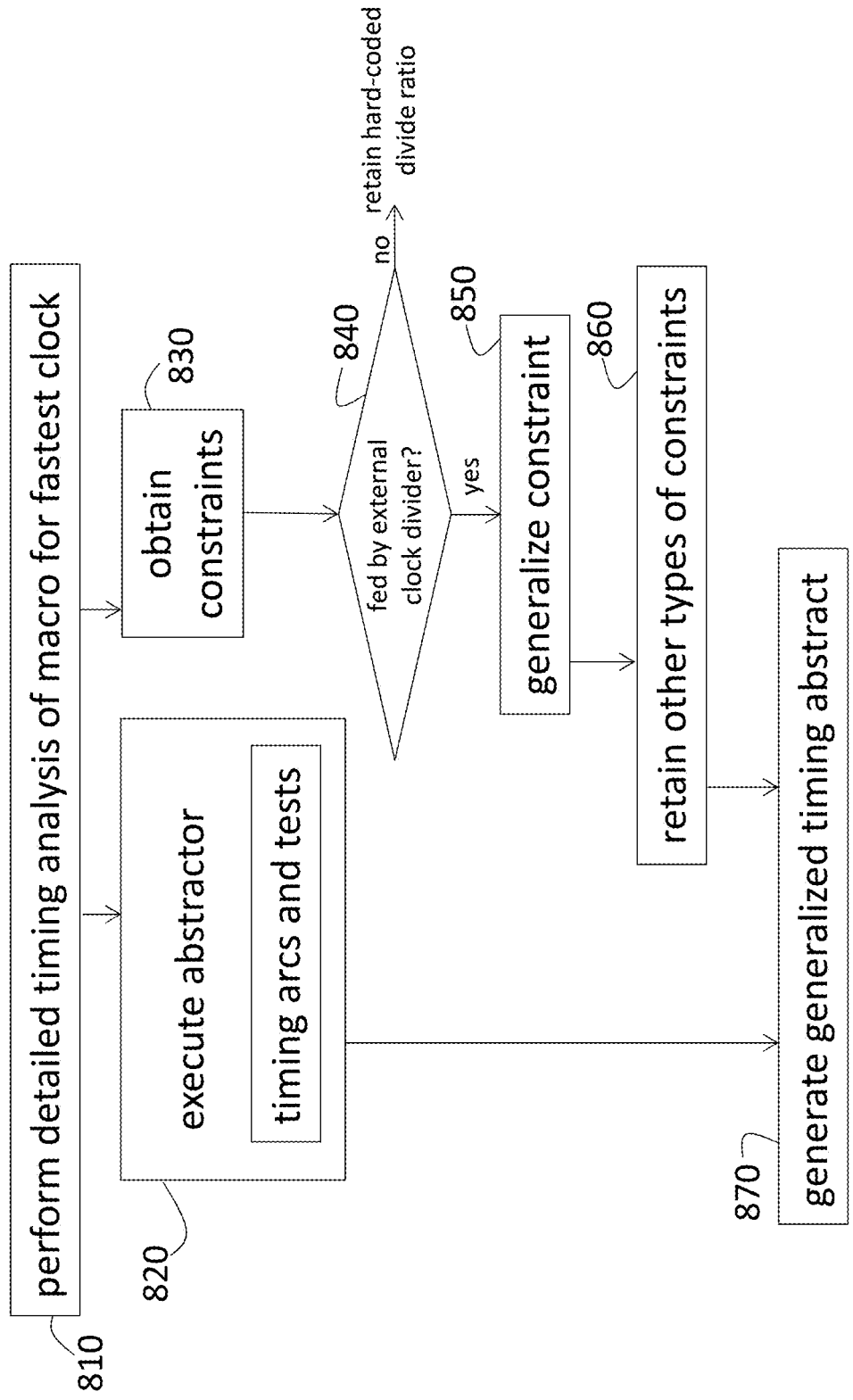
FIG. 8 is a process flow of a method of generalizing a clock division constraint at the output port of a local clock buffer according to one or more embodiments.

FIG. 8 is a process flow of a method of generalizing a clock division constraint at the output port 245 of a local clock buffer 240 according to one or more embodiments. While the processes shown in FIG. 7 pertain to a macro 210 itself, the processes shown in FIG. 8 pertain to a timing abstract of a macro 210. At block 810, performing detailed timing analysis of the macro 210 for the fastest clock includes determining the highest frequency at which the macro 210 is expected to be executed. Executing the abstractor, at block 820, results in timing arcs (the connections between nodes of the timing graph) and tests. This process is a conventional part of obtaining a timing abstract and is not further detailed. At block 830, obtaining constraints includes obtaining constraints at nodes of the timing graph and specifically identifying constraints at the output port 245 of the local clock buffers (LCBs) 240.

At block 840, the processes include determining whether the local clock buffer 240 is fed by an external clock divider 220. If the result of the check at block 840 is no (the local clock buffer 240 is fed by an internal clock divider 220), then the hard-coded divide ratio is retained. If the result of the check at block 840 is yes (the local clock buffer 240 is fed by an external clock divider 220), then generalizing the constraint refers to generalizing the divide ratio. Specifically, the divide ratio may be rephrased as a program instruction to use a divide ratio specified in the netname to determine the in-context divide ratio or to use a look-up table. That is, a look-up table may be generated for each context in which the timing abstract of the macro 210 is used, and the context information may be used to look up the specific divide ratio. Retaining other types of constraints, at block 860, ensures that the timing abstract includes all constraints in the original macro 210 in generating the generalized timing abstract at block 870.

Figure 9:
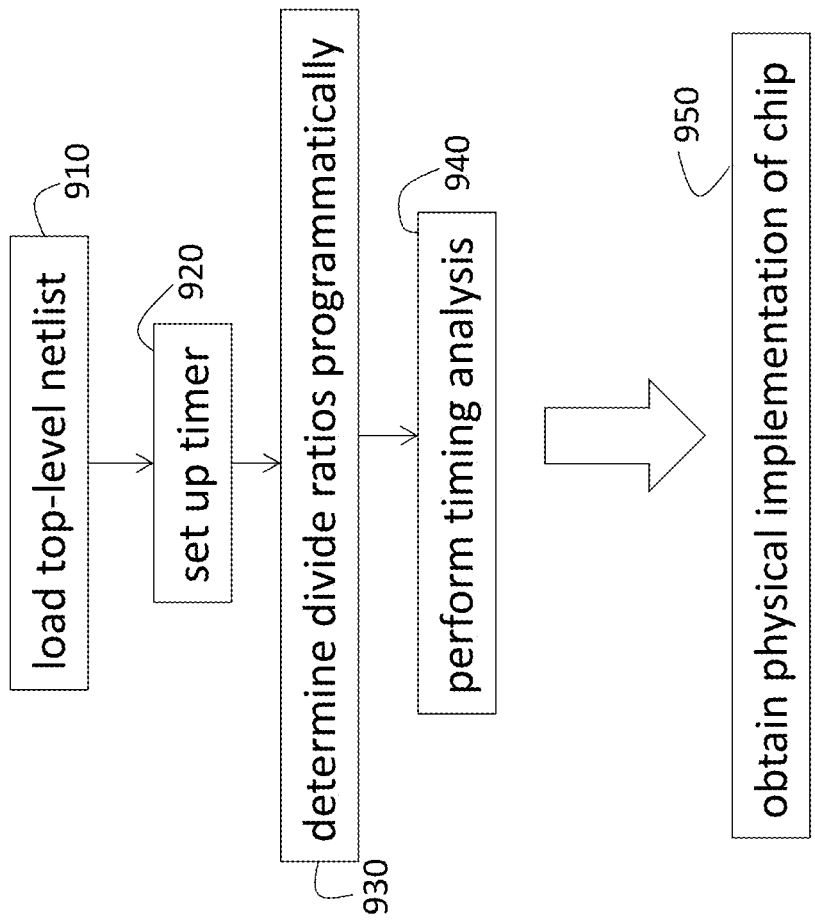
FIG. 9 is a process flow of a method of instantiating macros or macro timing abstracts to perform timing analysis according to one or more embodiments.

FIG. 9 is a process flow of a method of instantiating macros 210 or macro timing abstracts to perform timing analysis according to one or more embodiments. The processes of loading the top-level netlist (a description of the connectivity among lower-level components such as macros 210), at block 910, and setting up the timer, at block 920, are conventional processes used in timing analysis. The process of loading the top-level netlist (at block 910) is optional and only performed when the timing analysis is not only of one macro 210. Determining divide ratios programmatically, at block 930, refers to deriving the divide ratio for external clock dividers 220. When the timing analysis uses a macro 210 (alone or as part of a higher hierarchical analysis), the divide ratio may be derived from the netname or from the input port 215 constraints, as discussed with reference to FIG. 7. When the timing analysis uses a macro timing abstract (generated according to the processes at FIG. 8), the divide ratio may be derived from the netname or a look-up table, as discussed previously. Performing the timing analysis, at block 940, helps determine whether the design conforms to the requirements for the chip 120. Subsequently, obtaining the physical implementation of the chip 120, at block 950, is performed.

When a generalized timing abstract is generated according to the processes shown in FIG. 8, the generalized timing abstract may be instantiated in each context in which the associated macro 210 is used as discussed with reference to FIG. 9. To ensure that the generalized timing abstract may be used in a particular context, a verification process—discussed with reference to FIG. 10—must first be performed. In prior abstract generation processes, the verification has been limited to a check of whether the in-context cycle time at each local clock buffer 240 output port 245 is greater than or equal to the cycle time used at that local clock buffer 240 output port 245 to generate the abstract (i.e., the frequency used to generate the abstract is greater than or equal to the in-context frequency at each local clock buffer 240 output port 245).

According to the embodiments detailed herein, an additional check is performed. The additional check is a cross domain cycle time or frequency check (simply, cross domain check) and pertains to a pairwise check. That is, within a macro 210, two latches 250 may be driven by two different clocks and/or different divide ratios (i.e., the two latches are associated with different input ports 215 as shown in FIG. 3). In this case, the allowable time for a timing signal between the two latches is a function of both divide ratios.

Figure 10:
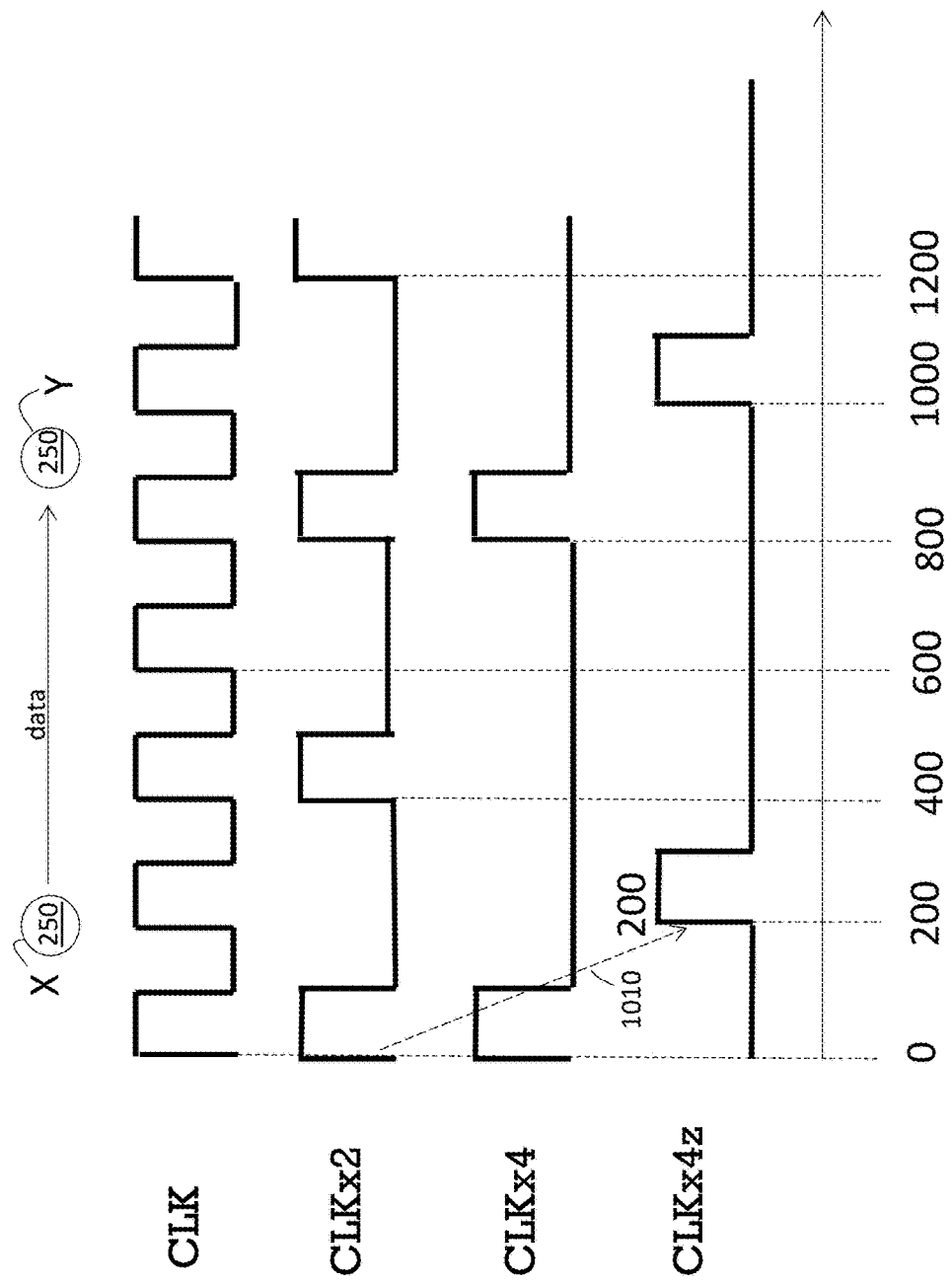
FIG. 10 shows exemplary clocks to illustrate cross domain checking according to one or more embodiments.

FIG. 10 shows exemplary clocks to illustrate cross domain checking according to one or more embodiments. As shown in FIG. 10, latch 250 X sends data to another latch 250 Y. In this case, latch 250 X may be referred to as the launch latch 250 X, and latch 250 Y may be referred to as the capture latch 250 Y. A clock edge (e.g., rising edge or falling edge) of the clock associated with the launch latch 250 and a clock edge of the clock associated with the capture latch 250 are considered along with a greatest common divisor (GCD) in the cross domain that is further detailed below. The GCD is the greatest common divider of the cycle times of the two clocks associated with the launch latch 250 and the capture latch 250. The check that is done involves computing an effective cycle time based on the GCD, clock edge of the launch latch 250 clock, and clock edge of the capture latch 250 clock both out of context and then in context. The in-context effective cycle time value must be greater than or equal to the out-of-context effective cycle time value. The effective cycle time value computation is given by:

$$GCD + capture\_edge - launch\_edge \quad [EQ. 1]$$

The clocks shown in FIG. 10 are used to explain the use of EQ. 1, but the cross domain check detailed herein pertains to any clock divider 220 values. In FIG. 10, CLK indicates a clock generator 205 with a base clock signal 206 that has a period of 200 picoseconds. CLKx2 indicates a clock signal resulting from a divide ratio of two from the base clock signal 206 (e.g., the signal at the output port 245-1 of the local clock buffer 240-1 in FIG. 3). The period of CLKx2 is double that of CLK and is 400 picoseconds. CLKx4 indicates a clock signal resulting from a divide ratio of four from the base clock signal 206 (e.g., the signal at the output port 245-2 of the local clock buffer 240-2 in FIG. 3). The period of CLKx4 is four times that of CLK and is 800 picoseconds. The clock signal CLKx4$z$ is a shifted version of CLKx4, as shown in FIG. 10. The period of CLKx4$z$ is also 800 picoseconds.

In the examples used to explain the cross domain check, the macro timing abstract is assumed to have been generated using CLKx4 as the clock signal associated with launch latch 250 X and CLKx2 as the clock signal associated with capture latch 250 Y. Further, rising edges are used as the exemplary clock edges in EQ. 1. With CLKx4 and CLKx2 as the clocks used in the macro timing abstract generation, the GCD or greatest common cycle time divider for CLKx4 and CLKx2 is the greatest common divider of 400 picoseconds and 800 picoseconds, which is 400 picoseconds. The rising edge of CLKx4, the launch latch 250 X clock signal is at 0 and, although the rising edge of CLKx2, the capture latch 250 Y clock signal is at 400 (the first rising edge after the launch latch 250 X clock cycle), it is idealized to 0 (as is common practice). Thus, the effective cycle time according to EQ. 1 is 400+0−0 or 400. This is the out-of-context effective cycle time that will be used in the cross domain check.

As an exemplary in-context scenario, CLKx4 may now represent the clock signal for both the launch latch 250 X and the capture latch 250 Y (i.e., the divide ratio of the clock divider 220-1 in FIG. 3 is changed from two to four in a particular context). In this case, the GCD becomes the greatest common divider of 800 picoseconds and 800 picoseconds, which is 800 picoseconds. The rising edge of CLKx4, the launch latch 250 X clock signal is at 0. Although the rising edge of CLKx4, the capture latch 250 Y clock signal, is at 800 (the first rising edge following the clock cycle of the launch latch 250 X), it is again idealized to 0. Thus, the effective cycle time according to EQ. 1 becomes 800+0−0 or 800. This in-context effective cycle time (800) is greater than the out-of-context effective cycle time (400) that was derived above. Thus, the cross domain check is passed and, based on the result of other cross domain checks associated with latches 250 of the macro timing abstract, the macro timing abstract may be used in timing analysis for this particular context.

As another exemplary in-context scenario, CLKx4$z$ may now represent the clock signal for the capture latch 250 Y while CLKx2 represents the clock signal for the launch latch 250 X. The GCD becomes the greatest common divider of 800 picoseconds and 400 picoseconds, which is 400 picoseconds. The rising edge of CLKx2, the launch latch 250 X clock signal is at 0. Because of the shift in CLKx4$z$, the rising edge of CLKx4$z$, the capture latch 250 Y clock signal is at 200. This is indicated by arrow 1010 in FIG. 10. As a result, the effective cycle time according to EQ. 1 becomes 400+0−200 or 200. This in-context effective cycle time (200) is not greater than or equal to the out-of-context effective cycle time (400). Thus, the cross domain check fails, and the macro timing abstract may result in error if used in this context.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of using a generalized macro or a generalized macro timing abstract for a timing analysis in a specific timing context, the method comprising:
setting up a timer;
determining, using a processor, a divide ratio of each external clock divider of one or more external clock dividers associated with the generalized macro or the generalized macro timing abstract programmatically as a function of another value;
performing the timing analysis using the divide ratios of the one or more external clock dividers; and
generating the generalized macro timing abstract based on performing a detailed timing analysis of an associated macro using an initial timing context defined by a fastest expected clock.

2. The method according to claim 1, wherein the determining the divide ratio of each external clock divider of the one or more external clock dividers as the function of another value includes determining the divide ratio according to a name of a timing signal corresponding with each external clock divider when the timing analysis is a hierarchical timing analysis involving more than one hierarchical level of a design of the integrated circuit.

3. The method according to claim 1, wherein the determining the divide ratio of each external clock divider of the one or more external clock dividers as the function of another value includes determining the divide ratio based on a constraint at an input port of the generalized macro associated with each external clock divider.

4. The method according to claim 1, wherein the determining the divide ratio of each external clock divider of the one or more external clock dividers as the function of another value includes determining the divide ratio for the generalized macro timing abstract based on a look-up table.

5. The method according to claim 1, further comprising performing a cross domain check to verify the generalized macro timing abstract for the specific timing context based on the generalized macro timing abstract including a launch latch that sends data and a capture latch that receives data from the launch latch, wherein the launch latch and the capture latch are associated with two different external clock dividers.

6. The method according to claim 5, wherein the performing the cross domain check includes comparing an effective cycle time value computed for the initial timing context with the effective cycle time value computed for the specific timing context.

7. The method according to claim 6, further comprising computing the effective cycle time value according to:

GCD+capture_edge−launch_edge, where

GCD is a greatest common divider of clock cycles of the two different external clock dividers, launch_edge is a time of a clock edge of a clock signal driving the launch latch, and capture_edge is a time of a clock edge of a clock signal driving the capture latch.

8. A computer program product for using a generalized macro or a generalized macro timing abstract for a timing analysis in a specific timing context, the computer program product comprising a non-transitory computer readable storage medium having program instructions embodied therewith, the program instructions executable by a processor to perform a method comprising:
setting up a timer;
determining a divide ratio of each external clock divider of one or more external clock dividers associated with the generalized macro or the generalized macro timing abstract programmatically as a function of another value;
performing the timing analysis using the divide ratios of the one or more external clock dividers; and
generating the generalized macro timing abstract based on performing a detailed timing analysis of an associated macro using an initial timing context defined by a fastest expected clock.

9. The computer program product according to claim 8, wherein the determining the divide ratio of each external clock divider of the one or more external clock dividers as the function of another value includes determining the divide ratio according to a name of a timing signal corresponding with each external clock divider when the timing analysis is a hierarchical timing analysis involving more than one hierarchical level of a design of the integrated circuit.

10. The computer program product according to claim 8, wherein the determining the divide ratio of each external clock divider of the one or more external clock dividers as the function of another value includes determining the divide ratio based on a constraint at an input port of the generalized macro associated with each external clock divider or determining the divide ratio for the generalized macro timing abstract based on a look-up table.

11. The computer program product according to claim 8, further comprising performing a cross domain check to verify the generalized macro timing abstract for the specific timing context based on the generalized macro timing abstract including a launch latch that sends data and a capture latch that receives data from the launch latch, wherein the launch latch and the capture latch are associated with two different external clock dividers, and wherein the performing the cross domain check includes comparing an effective cycle time value computed for the initial timing context with the effective cycle time value computed for the specific timing context, and computing the effective cycle time value according to:

GCD+capture_ri sin g_edge−launch_ri sin g_edge, where

GCD is a greatest common divider of clock cycles of the two different external clock dividers, launch_rising_edge is a time of a rising edge of a clock signal driving the launch latch, and capture_rising_edge is a time of a rising edge of a clock signal driving the capture latch.

* * * * *